(12) United States Patent
Janajreh et al.

(10) Patent No.: US 12,365,601 B2
(45) Date of Patent: Jul. 22, 2025

(54) INTEGRATED THERMOACOUSTIC FREEZE DESALINATION SYSTEMS AND PROCESSES

(71) Applicant: Khalifa University of Science and Technology, Abu Dhabi (AE)

(72) Inventors: Isam Janajreh, Abu Dhabi (AE); Didarul Islam, Abu Dhabi (AE); Sufian Abedrabbo, Abu Dhabi (AE); Hongtao Zhang, Abu Dhabi (AE); Ussama Ali, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 210 days.

(21) Appl. No.: 18/269,374

(22) PCT Filed: Feb. 18, 2022

(86) PCT No.: PCT/IB2022/051483
§ 371 (c)(1),
(2) Date: Jun. 23, 2023

(87) PCT Pub. No.: WO2022/175897
PCT Pub. Date: Aug. 25, 2022

(65) Prior Publication Data
US 2024/0083776 A1   Mar. 14, 2024

Related U.S. Application Data

(60) Provisional application No. 63/151,835, filed on Feb. 22, 2021.

(51) Int. Cl.
*C02F 1/00* (2023.01)
*C02F 1/22* (2023.01)
(Continued)

(52) U.S. Cl.
CPC ............ *C02F 1/22* (2013.01); *F25B 9/00* (2013.01); *C02F 2103/08* (2013.01)

(58) Field of Classification Search
CPC ....... C02F 1/22; C02F 1/26; F25B 2309/1402
See application file for complete search history.

(56) References Cited

U.S. PATENT DOCUMENTS 4,112,702 A * 9/1978 Smirnov ............... B01D 9/04
                                                              62/343
4,532,765 A   8/1985 Corey
(Continued)

FOREIGN PATENT DOCUMENTS

CN    203373179 U    1/2014
DE      1519592 A1    8/1970
(Continued)

OTHER PUBLICATIONS

"Thermoacoustic Refrigeration", 2 pages.
(Continued)

*Primary Examiner* — Brian M King
(74) *Attorney, Agent, or Firm* — Billion & Armitage

(57) ABSTRACT

Embodiments provide an integrated thermoacoustic freeze desalination system (100,106) and process including a thermoacoustic engine (102), wherein the thermoacoustic engine (102) is configured to generate mechanical energy in the form of acoustic waves (112) using heat supplied from a heat source (108); a thermoacoustic refrigerator (104) acoustically coupled to the thermoacoustic engine (102), wherein the thermoacoustic refrigerator (104) is adapted to use the mechanical energy in the acoustic waves (112) produced by the thermoacoustic engine (102) to remove heat from a coolant flowing through said thermoacoustic refrigerator (104); and a freeze desalination system (100, 106) fluidly coupled to the thermoacoustic refrigerator (104) and the thermoacoustic engine (102), wherein the freeze desali-
(Continued)

nation system (100, 106) is configured to desalinate brine (120) via a process in which the coolant from the thermoacoustic refrigerator (104) flows through the freeze-desalination system (100,106) and causes at least a portion of the water from the brine (120) to freeze and separate from the brine.

20 Claims, 5 Drawing Sheets

(51) Int. Cl.
  *F25B 9/00* (2006.01)
  *C02F 103/08* (2006.01)

(56) References Cited

U.S. PATENT DOCUMENTS

| | | | | |
|---|---|---|---|---|
| 6,574,979 | B2 * | 6/2003 | Faqih | E03B 3/28 |
| | | | | 62/93 |
| 6,684,648 | B2 * | 2/2004 | Faqih | E03B 3/28 |
| | | | | 62/93 |
| 7,772,746 | B2 | 8/2010 | Keolian et al. | |
| 9,562,522 | B2 | 2/2017 | Agnon et al. | |
| 10,246,349 | B2 | 4/2019 | Cioanta et al. | |
| 2017/0057843 | A1 | 3/2017 | Cioanta et al. | |

FOREIGN PATENT DOCUMENTS

| | | |
|---|---|---|
| DE | 2837727 A1 | 3/1980 |
| DE | 2921728 A1 | 12/1980 |
| FR | 2925894 A1 | 7/2009 |
| RU | 2010105778 A | 8/2011 |

OTHER PUBLICATIONS

Babaei, Hadi , et al., "Sustainable thermoacoustic refrigeration system for gas turbine power plants", 17th symposium of industrial application of gas turbines (IGAT). 2007.

Desai, A. B , "Optimization of thermoacoustic engine driven thermoacoustic refrigerator using response surface methodology", IOP Conference Series: Materials Science and Engineering. vol. 171. No. 1. IOP Publishing, 2017.

El Kadi, Khadije , "Desalination by freeze crystallization: an overview", Int. J. Therm. Environ. Eng 15.2 (2017): 103-110.

Elshabrawy, Somayya Esmat,, et al., "Thermo-acoustic Engine Pressure Wave: Analysis of Working Fluid Effect", JJMIE 13.4 (2019).

Hussain, Mohammed , et al., "Analysis of pressure wave development in a thermo-acoustic engine and sensitivity study", Energy Procedia 142 (2017): 1488-1495.

"International Search Report and Written Opinion dated May 18, 2022.", for PCT Application No. PCT/IB2022/051483, 10 pages.

Ministry of Energy & Infrastructure; Updated UAE Energy Strategy 2050; dated Jul. 2023; 16 pages.

The UAE Water Security Strategy 2036; Environment and energy (/en/about-the-uae/strategies-initiatives-and-awards/strategies-plans-and-visions/environment-and-energy); Updated Aug. 9, 2023; 1 page.

"International Preliminary Report on Patentability Received mailed on Aug. 31, 2023", 6 Pages.

À Nijeholt, Lycklama , et al., "Simulation of a traveling-wave thermoacoustic engine using computational fluid dynamics", The Journal of the Acoustical Society of America 118.4 (2005): 2265-2270.

Atchley, Anthony A., et al., "Acoustically generated temperature gradients in short plates", The Journal of the Acoustical Society of America 88.1 (1990): 251-263.

Backhaus, S. , et al., "Traveling-wave thermoacoustic electric generator", Applied physics letters 85.6 (2004): 1085-1087.

Biwa, Tetsushi , et al., "Low temperature differential thermoacoustic Stirling engine", Applied physics letters 97.3 (2010).

Cao, N. , et al., "Energy flux density in a thermoacoustic couple", The Journal of the Acoustical Society of America 99.6 (1996): 3456-3464.

Ceperley, Peter H., et al., "Gain and efficiency of a short traveling wave heat engine", The journal of the acoustical society of America 77.3 (1985): 1239-1244.

El Kadi, Khadije , et al., "Desalination by freeze crystallization: an overview", Int. J. Therm. Environ. Eng 15.2 (2017): 103-110.

El Kadi, Khadije , et al., "Experimental and numerical investigation of desalination by indirect directional freezing", International Conference on Applied Energy. 2019.

Heist, James A., et al., "Freeze crystallization processes: Efficiency by flexibility", (1983).

Hendrickson, Harold M., et al., "Research and development of processes for desalting water by freezing", No. 10. US Department of the Interior, 1956.

Herman, Cila , et al., "Cool sound: the future of refrigeration? Thermodynamic and heat transfer issues in thermoacoustic refrigeration", Heat and mass transfer 42 (2006): 492-500.

Himawan, Chrismono , "Characterization and population balance modelling of Eutectic Freeze Crystallization", (2005).

Johnson, Wallace E., "State-of-the-art of freezing processes, their potential and future", Desalination 19.1-3 (1976): 349-358.

Karnofsky, George , et al., "Saline water conversion by direct freezing with butane", Available from the National Technical Information Service, Springfield VA 22161 as PB-161 819, Price codes: A 05 in paper copy, A 01 in microfiche. OSW Research and Development Progress Report 40 (1960).

Kucera, Jane , "Desalination: water from water.", John Wiley & Sons, 2019; 756 pages.

Lu, Z. , et al., "Freezing desalination process", Thermal desalination processes 2 (2010); 7 pages.

Mahdavi, Mokhtar , et al., "Application of freezing to the desalination of saline water", Arabian Journal for Science and Engineering 36 (2011): 1171-1177.

Mcculloch, Archie , et al., "Releases of refrigerant gases (CFC-12, HCFC-22 and HFC-134a) to the atmosphere", Atmospheric Environment 37.7 (2003): 889-902.

Panton, Ronald L., "Incompressible flow", John Wiley & Sons, 2006.

Phelan, Patrick E., et al., "Designing a mesoscale vapor-compression refrigerator for cooling high-power microelectronics", The Ninth Intersociety Conference on Thermal and Thermomechanical Phenomena In Electronic Systems (IEEE Cat. No. 04CH37543). vol. 1. IEEE, 2004.

Rahman, Mohammad Shafiur, et al., "Freezing-melting process and desalination: I. Review of the state-of-the-art", Separation & Purification Reviews 35.02 (2006): 59-96.

Randall, D. G. , et al., "A case study for treating a reverse osmosis brine using Eutectic Freeze Crystallization—Approaching a zero waste process", Desalination 266.1-3 (2011): 256-262.

Reid, R. S. , et al., "Experiments with a flow-through thermoacoustic refrigerator", The Journal of the Acoustical Society of America 108.6 (2000): 2835-2842.

Russell, Daniel A., et al., "Tabletop thermoacoustic refrigerator for demonstrations", American Journal of Physics 70.12 (2002): 1231-1233.

Swift, G. W. , et al., "Analysis and performance of a large thermoacoustic engine", the Journal of the Acoustical Society of America 92.3 (1992): 1551-1563.

Swift, Gregory W., "Thermoacoustic engines", the Journal of the Acoustical Society of America 84.4 (1988): 1145-1180.

Swift, G. W. , et al., "Thermoacoustics in pin-array stacks", The Journal of the Acoustical Society of America 94.2 (1993): 941-943.

Swift, Gregory W., et al., "Thermoacoustics: A unifying perspective for some engines and refrigerators", (2003): 2379-2381; 339 pages.

Wang, Peng , et al., "A conceptual demonstration of freeze desalination-membrane distillation (FD-MD) hybrid desalination process utilizing liquefied natural gas (LNG) cold energy", Water research 46.13 (2012): 4037-4052.

(56) References Cited

OTHER PUBLICATIONS

Wheatley, John C., et al., "The natural heat engine", Los Alamos Science 14.2 (1986): 2-33.
Wiegandt, Herbert F., et al., "Desalting of seawater by freezing", United States Department of the Interior; (1968).
Williams, Paul M., et al., "Technology for freeze concentration in the desalination industry", Desalination 356 (2015): 314-327.
Wollan, John J., et al., "Development of a thermoacoustic natural gas liquefier", No. LA-UR-02-1623. Los Alamos National Lab. (LANL), Los Alamos, NM (United States), 2002.
Worlikar, Aniruddha S., et al., "Numerical simulation of a thermoacoustic refrigerator: I. Unsteady adiabatic flow around the stack", Journal of Computational Physics 127.2 (1996): 424-451.
Worlikar, Aniruddha S., et al., "Numerical simulation of a thermoacoustic refrigerator: II. Stratified flow around the stack", Journal of Computational Physics 144.2 (1998): 299-324.
Yazaki, T., et al., "Traveling wave thermoacoustic engine in a looped tube", Physical Review Letters 81.15 (1998): 3128.
Yu, Guoyao, et al., "CFD simulation of a 300 Hz thermoacoustic standing wave engine", Cryogenics 50.9 (2010): 615-622.

\* cited by examiner

INTEGRATED THERMOACOUSTIC FREEZE DESALINATION SYSTEMS AND PROCESSES

BACKGROUND

Desalination is an important process for increasing the supply of potable water in many parts of the world. However, desalination remains an energy-intensive and inefficient process. A need exists for desalination systems and processes that improve the energy efficiency and are scalable.

SUMMARY

The present invention relates to systems and processes for water desalination and, in particular, to integrated thermoacoustic freeze desalination systems and processes for water desalination.

In one aspect of the invention, an integrated thermoacoustic freeze desalination system is provided. The integrated thermoacoustic freeze desalination system may include a thermoacoustic engine, wherein the thermoacoustic engine is configured to generate mechanical energy in the form of acoustic waves using heat supplied from a heat source; a thermoacoustic refrigerator acoustically coupled to the thermoacoustic engine, wherein the thermoacoustic refrigerator is adapted to use the mechanical energy in the acoustic waves produced by the thermoacoustic engine to remove heat from a coolant flowing through said thermoacoustic refrigerator; and a freeze desalination system fluidly coupled to the thermoacoustic refrigerator and the thermoacoustic engine, wherein the freeze desalination system is configured to desalinate brine via a process in which the coolant from the thermoacoustic refrigerator flows through the freeze-desalination system and causes at least a portion of the water from the brine to freeze and separate from the brine.

In another aspect of the invention, an integrated thermoacoustic freeze desalination process is provided. The integrated thermoacoustic freeze desalination process may include one or more of the following steps: (a) supplying heat from a heat source to a thermoacoustic engine, wherein the thermoacoustic engine uses said heat to generate mechanical energy in the form of acoustic waves; (b) applying the mechanical energy in the acoustic waves produced by the thermoacoustic engine to a thermoacoustic refrigerator to remove heat from a coolant passing through said thermoacoustic refrigerator; and (c) flowing the coolant from the thermoacoustic refrigerator through a freeze desalination system to desalinate brine, wherein the coolant causes at least a portion of the water from the brine to freeze and separate from the brine.

In other aspects of the invention, thermoacoustic engines, thermoacoustic refrigerators, freeze desalination systems, any components thereof, and related methods are provided.

DETAILED DESCRIPTION

The present invention provides integrated thermoacoustic freeze desalination systems and processes that provide sustainable green solutions for the economical and energy-efficient production of potable water. The present inventive systems and processes provide a number of advantages over traditional desalination processes (e.g., reverse osmosis desalination processes). For example, the present inventive systems and processes can be powered mostly or entirely via renewable energy sources and/or industrial waste heat. Further, the present inventive systems and processes use fewer or no moving parts, thereby simplifying maintenance, reducing mechanical wear, and extending longevity of said systems and processes. Still further, the present invention provides systems and processes for desalination of water with little or no use of harmful chemicals or hazardous refrigerants. The present invention provides systems and processes that operate with significantly lower amounts of energy as compared to conventional desalination systems such as osmotic desalination systems or thermal desalination systems, which require relatively large amounts of electrical energy to produce the requisite hydraulic pressures or temperatures needed to purify water.

Figure 1:
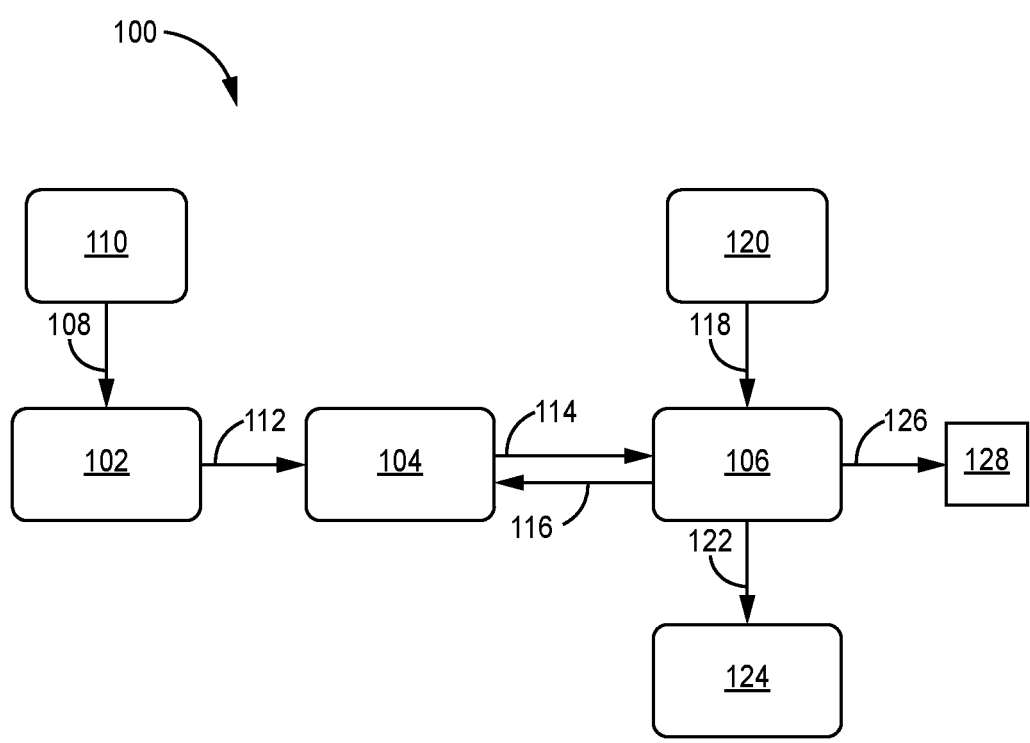
FIG. 1 is a block diagram of an integrated thermoacoustic freeze desalination system and process, according to one or more embodiments of the invention.

FIG. 1 illustrates a block diagram of one embodiment of the present invention that includes integrated thermoacoustic freeze desalination system and process 100. System and process 100 includes thermoacoustic engine 102, thermoacoustic refrigerator 104, freeze desalination system 106, energy or heat source 110, brine source 120, water collector 124, and brine collector 128.

Heat 108 from heat source 110 is directed to thermoacoustic engine 102. Thermoacoustic engine 102 converts heat 108 from heat source 110 into acoustic power in the form of acoustic waves 112. Hence, engine 102 uses supplied heat 108 to generate acoustic waves 112. Heat source 110 may include a renewable source of energy such as a solar source (e.g., a solar dish or other concentrated solar energy source). Alternatively, or in addition, heat source 110 may include a source of waste heat from another system such as an internal combustion engine, a gas turbine, a steam turbine, an industrial fire heating, a steam boiler, a metal melting furnace, a refinery flair, or the like. Typically, heat from such sources is not easily utilized in traditional industrial processes. However, by harnessing the heat from such sources to power a thermoacoustic engine and produce acoustic waves, the present invention can utilize their heat to desalinate water.

Acoustic waves 112 are directed towards thermoacoustic refrigerator 104. Thermoacoustic refrigerator 104 utilizes acoustic waves 112 as a power source to drive a refrigeration cycle and remove heat from a coolant fluid. Hot coolant fluid 116 is directed into thermoacoustic refrigerator 104 from freeze desalination system 106. Freeze desalination system 106 removes heat from hot coolant fluid 116 via its refrigeration cycle, thereby producing cold coolant fluid 114. Thermoacoustic engine 102 and thermoacoustic refrigerator 104 may be integrated to produce a cooling load at or near about 40% Carnot conversion efficiency or less (e.g., at least −40%, −30%, −20%, −10% Carnot conversion efficiency or less). Cold coolant 114 may be discharged from thermoacoustic refrigerator 104 at a temperature suitable for conducting freeze desalination (e.g., at a temperature sufficiently low to cause water from a brine solution to form ice).

Fresh brine 118 is directed into freeze desalination system 106 from brine source 120. Brine source 120 is not particularly limited and may include, for example, one or more of brine, seawater, fresh water, brackish water, saline water, wastewater (e.g., waste brine from reverse osmosis plants, etc.), and the like.

Cold coolant fluid 114 from thermoacoustic refrigerator 104 and fresh brine 118 from brine source 120 are both directed into freeze desalination system 106. Freeze desalination system 106 uses cold coolant fluid 114 to lower the temperature of fresh brine 118 to initiate nucleation of ice crystals within the brine of system 106. Nucleation at the onset of crystal formation may produce a growing crystal that naturally rejects salts and other impurities, thereby providing a mechanism for obtaining pure water or at least purer water from the brine. For example, the freeze desalination system 106 may be used to separate water from brine (e.g., for water desalination, to desalinate the brine/water, etc.) through the directional freezing in which a first formed layer of ice in brine contains a lower concentration of salt and other impurities than the initial brine.

The resulting ice may be collected, separated from the mother brine, and allowed to melt to form a solution after which the melt solution may be subjected to another cycle of freezing and melting for further desalination. In some embodiments, the ice is washed prior to being allowed to melt. In some embodiments, heat from the heat source or heat from one or more of the heat exchangers of the thermoacoustic refrigerator is used to melt the ice. This process may be repeated one or more times until the salinity of water reaches desired salinity levels, such as, for example, levels suitable for potable water (e.g., less than 1 g $L^{-1}$). The resulting desalinated water 122 is directed into water collector 124, while concentrated brine 126 is directed into brine collector 128.

As mentioned above, a cold coolant 114 is used by freeze desalination system 106 to induce crystallization of water. As cold coolant 114 flows through freeze desalination system 106 it may be used, for example, in one or more additional freeze-melting cycles and, as it is so used, the temperature of cold coolant 114 may gradually increase until the temperature of coolant 114 is no longer suitable to induce the formation of ice crystals or more generally desalinate brine and is therefore considered to be hot coolant 116. Integrated thermoacoustic freeze desalination system 100 may be scaled and designed such that, for example, hot coolant 116 may be returned to thermoacoustic refrigerator 104. Thermoacoustic refrigerator 104 may be configured to remove heat from hot coolant 116, thereby reducing the temperature of hot coolant 116, using mechanical energy in acoustic waves 112 produced by the thermoacoustic engine 102 to effectuate and drive refrigeration. Upon reaching a sufficiently low temperature, cold coolant 114 may be returned to freeze desalination system 106 for one or more additional freeze-melting cycles.

Integrated thermoacoustic freeze desalination system and process 100 of FIG. 1 may be operated as either a batch or continuous process for the continuous or batch production of desalinated water, optionally without the use of utility power. Water that includes at least one type of salt, at any concentration, may be used herein. Examples of brine 118 including, without limitation, water including any concentration of at least one dissolved salt (e.g., without limitation, one or more of sodium chloride, calcium chloride, strontium chloride, magnesium chloride, potassium chloride, ferric chloride, ferrous chloride, hydrates thereof, and the like). Concentrations may be, for example and without limitation, at least about 1 ppm by weight, or at least any one of, equal to any one of, or between any two of about 1 ppm, about 50 ppm, about 250 ppm, about 500 ppm, about 750 ppm, about 1,000 ppm, about 5,000 ppm, about 10,000 ppm, about 50,000 ppm, about 100,000 ppm, or greater.

Figure 2:
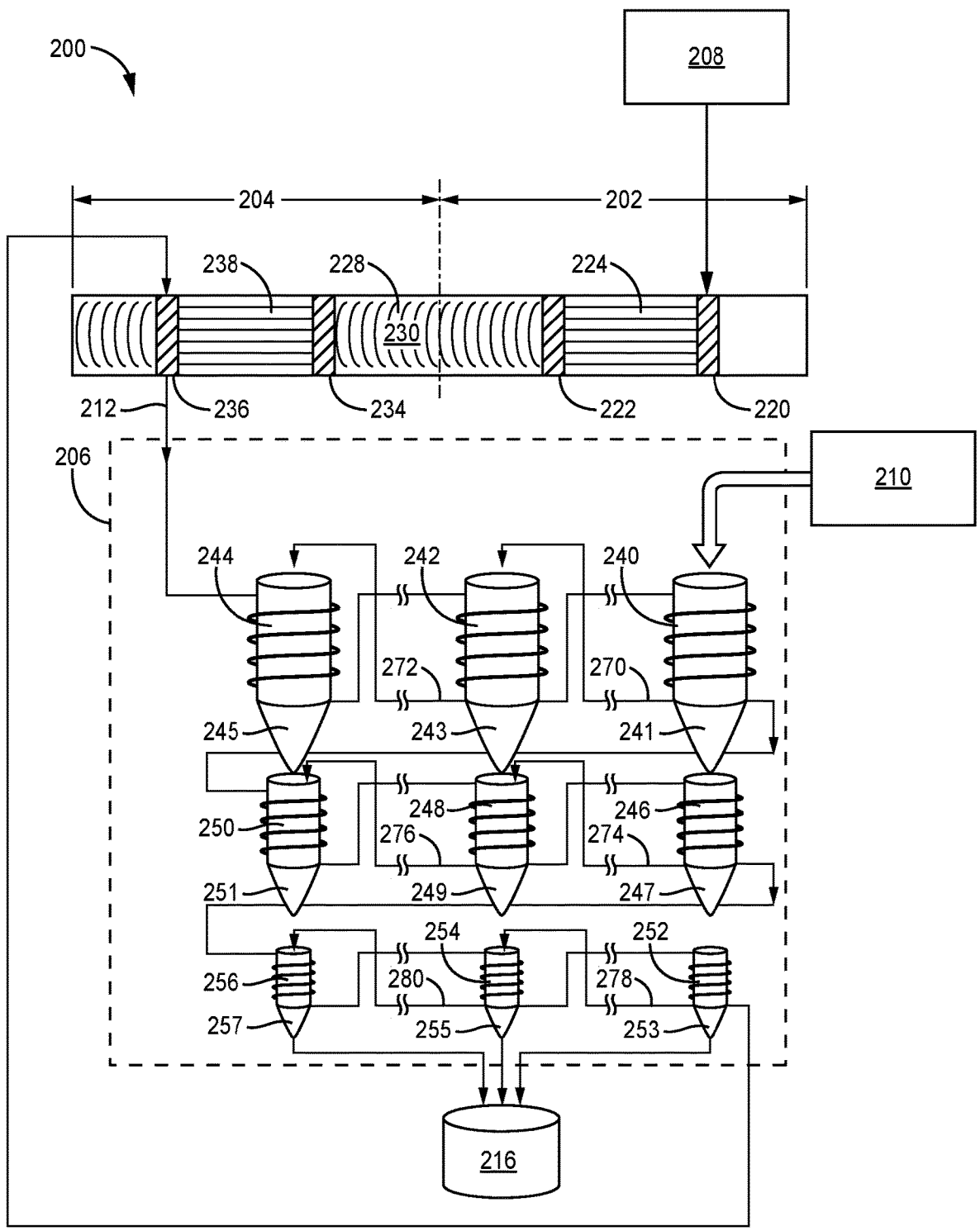
FIG. 2 is a schematic diagram of an integrated water desalination system and process, according to one or more embodiments of the invention.

FIG. 2 is schematic diagram of integrated thermoacoustic freeze desalination system and process 200, according to one or more embodiments of the invention. As shown in FIG. 2, integrated thermoacoustic freeze desalination system and process 200 may include freeze desalination system 206 integrated with thermoacoustic refrigerator 204 and thermoacoustic engine 202. As explained in further detail below, thermoacoustic refrigerator 204 and thermoacoustic engine 202 may be integrated within resonator 230. A high or low temperature heat source 208 may be provided for supplying heat to thermoacoustic engine 202. A high temperature heat source 208 may exhibit an inlet temperature (e.g., at heat exchanger 220) of about 800° C. or less, such as about equal to any one of, or between any two of, about 800° C., about 750° C., about 700° C., about 650° C., about 600° C., about 550° C., about 500° C., about 450° C., about 400° C., about 350° C., about 300° C., or about 251° C. A low temperature heat source 208 may exhibit inlet temperatures (e.g., at heat exchanger 220) of between 15° C. and 250° C., such as about equal to any one of, or between any two of, about 250° C., about 200° C., about 150° C., about 100° C., about 50° C., or about 15° C. Brine source 210 may be provided for supplying a brine feed stream to freeze desalination system 206. Colling liquid circuit 212 may be provided for conveying a coolant of varying temperature between thermoacoustic refrigerator 204 and freeze desalination system 206 (e.g., from thermoacoustic refrigerator 204 to freeze desalination system 206 and/or from freeze desalination system 206 to thermoacoustic refrigerator 204). Water collector 216 may be provided for collecting desalinated water from freeze desalination system 206. Integrated thermoacoustic freeze desalination system and process 200 of FIG. 2 may include any of the features, characteristics, and properties of integrated thermoacoustic freeze desalination system and process 100 of FIG. 1. Accordingly, for example, any of the heat sources and/or brine sources of the present disclosure may be used herein without departing from the scope of the present invention.

As mentioned above, thermoacoustic engine 202 may produce acoustic waves used to drive operation of thermoacoustic refrigerator 204. To enable operable integration of thermoacoustic engine 202 with thermoacoustic refrigerator 204, each may be acoustically coupled to each other (e.g., within resonator 230) such that the acoustic waves produced by thermoacoustic engine 202 are incident upon thermoacoustic refrigerator 204. The incident acoustic waves may supply mechanical energy/work utilized by thermoacoustic refrigerator 204 to drive heat removal from the coolant passing through thermoacoustic refrigerator 204. Thermoacoustic engine 202 and thermoacoustic refrigerator 204 may also be fluidly coupled to each other via a working gas within resonator 230. Examples of the working gas include, without limitation, one or more of air, helium, argon, neon, krypton, xenon, radon, $CO_2$, and the like. Combinations may be used (e.g., air with helium, air with $CO_2$, etc.) to modulate viscosity, thermal conductivity, and specific heat of the working fluids. The working gas may be used for transporting the acoustic waves from, for example, thermoacoustic engine 202 to thermoacoustic refrigerator 204. In the illustrated embodiment of FIG. 2, resonator 230 may be used to acoustically couple and/or fluidly couple thermoacoustic engine 202 to thermoacoustic refrigerator 204. Resonator 230 may be implemented in standing wave thermoacoustic engines 202. In other embodiments, one or more regenerators (not shown) may be implemented in traveling or moving wave thermoacoustic engines. The resonator and/or regenerator may include one or more looped tube(s) and/or curved resonator and/or a curved regenerator.

In thermoacoustic engine 202, thermoacoustic engine stack 224 may be spatially disposed between first heat exchanger 220 and second heat exchanger 222, within the thermoacoustic engine 202, for transferring heat to and from external heat sources 208 and the working fluid within resonator 230. Thermoacoustic engine stack 224 may be a porous solid material, such as a porous stack of heating plates. Heat from external heat source 208 may be supplied to thermoacoustic engine 202 via first heat exchanger 220, forming a temperature gradient along the length of the thermoacoustic engine stack 224. The temperature gradient may create a pressure disturbance in the working fluid, causing the working fluid to oscillate in resonator 230. As the working fluid oscillates back and forth, compression and expansion of the working fluid by the sound pressure results in heat transfer from first heat exchanger 220 to second heat exchanger 222. Acoustic waves 228 cause the working fluid to oscillate back and forth. Since the oscillating working fluid, incident upon thermoacoustic refrigerator 204, imparts mechanical work, acoustic waves 228 may be used to drive thermoacoustic refrigerator 204.

In thermoacoustic refrigerator 204, thermoacoustic refrigerator stack 238 (e.g., a heat regenerative stack) may be spatially disposed between first heat exchanger 234 and second heat exchanger 236, within thermoacoustic refrigerator 204. Thermoacoustic refrigerator 204 may be operated as a standing wave device and/or a traveling wave device. Thermoacoustic refrigerator stack 238 may be similar to thermoacoustic engine stack 224 and may include, for example, a porous solid material such as a porous stack of heating plates. Acoustic waves 228 from thermoacoustic engine 202 may supply the input work required for heat to flow against a temperature gradient and thus remove heat from the hot coolant. Thermoacoustic refrigerator 204 and thermoacoustic engine 202 may use or share the same working gas. Thermoacoustic refrigerator 204 is able to achieve cold end temperatures of between −5° C. and −15° C., such as about equal to any one of, or between any two of, about −5° C., about −10° C., or about −15° C.

Upon exiting thermoacoustic refrigerator 204, the cold coolant may be directed to freeze desalination system 206, where it may participate in one or more freeze cycles, and upon completing one or more of said freeze cycles, may be directed back to thermoacoustic refrigerator 204 as a hot coolant stream. Thermoacoustic refrigerator 204 may regenerate the cold coolant stream by removing sufficient heat from the hot coolant stream to decrease the temperature thereof to a suitable freeze desalination temperature. The temperature of the cold coolant (e.g., the coolant exiting from the thermoacoustic refrigerator) should be sufficiently low to induce/cause crystallization of the water to ice. In some embodiments, for example, the temperature of the coolant may be at or near the freezing temperature of the brine. In some embodiments, the temperature of the coolant is sufficiently low such that the cold coolant can cool the brine to a temperature below the freezing temperature of said brine.

Freeze desalination system 206 may be multi-staged and may include a plurality of brine containers 240, 242, 244, 246, 248, 250, 252, 254, 256 for separating water from brine (e.g., performing water desalination) via one or more freeze-melting cycles. Brine source 210 may be in fluid communication with at least one of the plurality of brine containers 240, 242, 244, 246, 248, 250, 252, 254, 256, such as brine container 240, for supplying brine to freeze desalination system 206. Each of the plurality of brine containers 240, 242, 244, 246, 248, 250, 252, 254, 256 may include an ice collection chamber 241, 243, 245, 247, 249, 251, 255, 257, respectively, for melting the ice. Colling liquid circuit 212 may be in thermal contact with each of the plurality of brine containers 240, 242, 244, 246, 248, 250, 252, 254, 256 for inducing crystallization of the water to ice. In some embodiments, colling liquid circuit 212 includes cooling coils in thermal contact with said brine containers such that coolant flowing through the cooling coils may cause or induce ice formation within a brine container. Colling liquid circuit 212 may be wrapped around at least a portion of each of the plurality of brine containers 240, 242, 244, 246, 248, 250, 252, 254, 256. As shown in FIG. 2, the colling liquid circuit 212 forms coils around each of the plurality of brine containers 240, 242, 244, 246, 248, 250, 252, 254, 256, however, other arrangements of the cooling liquid circuit about or through the plurality of brine containers are possible and within the scope of the present invention.

The plurality of brine containers 240, 242, 244, 246, 248, 250, 252, 254, 256 may be connected in series, in parallel, or combinations thereof. In some embodiments, the freeze desalination system includes a first plurality of brine containers 240, 242, 244 connected in series, a second plurality of brine containers 246, 248, 250 connected in series, and a third plurality of brine containers 252, 254, 256 connected in series. For example, within the first plurality of brine containers 240, 242, 244, an increasingly concentrated brine stream may be conveyed from brine container 240 to brine container 242 via conduit 270, from brine container 242 to brine container 244 via conduit 272, and so on. In some embodiments, the first plurality of brine containers 240, 242, 242 are connected in parallel with the second plurality of brine containers 246, 248, 250, respectively; and the second plurality of brine containers 246, 248, 250 are connected in parallel with the third plurality of brine containers 252, 254, 256, respectively. For example, an increasingly desalinated water stream may be conveyed from brine container 240 to brine container 246, from brine container 242 to brine container 248, from brine container 244 to brine container 250, and so on.

Each of the plurality of brine containers 240, 242, 244, 246, 248, 250, 252, 254, 256 may be configured to separate at least a portion of water from brine via one or more freeze-melting cycles. A freeze-melting cycle may include a step in which water is crystallized to form ice and separated from the brine and a step in which the ice is allowed to melt. The crystallization of the water to ice may be induced by thermal contact with the colling liquid circuit 112 which conveys the cold coolant. The melting of ice may be performed in each of the ice collection chambers 241, 243, 245, 247, 249, 251, 255, 257 of the plurality of brine containers 240, 242, 244, 246, 248, 250, 252, 254, 256. Desalinated water may be collected in water collector 216 and coolant may be directed from the freeze desalination system 206 back to the thermoacoustic refrigerator 204 to regenerate the cold coolant for re-use in the freeze desalination system 206.

In operation, each freeze-melting cycle may include steps in which an increasingly concentrated solutions of brine are conveyed to one or more downstream brine containers connected in series and/or one or more downstream brine containers connected in parallel for further desalination, and steps in which an increasing desalinated solutions of water are conveyed to one or more downstream brine containers connected in series and/or one or more downstream brine containers connected in parallel for further desalination. Each successive freeze and melting cycle may produce, for example, a more concentrated solution of brine and a more desalinated solution of water. Each successive freeze and melting cycle may also cause the temperature of the coolant to increase. The integrated thermoacoustic freeze desalination system may exploit these features to enable use of a single coolant for more than one freeze-melting cycle. For example, a decrease in salinity of a water solution such as brine, may result in a corresponding increase in the freezing temperature of the same. Accordingly, despite the increase in coolant temperature, the temperature of the coolant may still be sufficiently low for continued use in downstream freeze-melting cycles because the downstream brine may freeze at higher temperatures due to reduced salinity levels.

The performance and/or operation of the integrated thermoacoustic freeze desalination system of FIGS. 1 and/or 2 may be configured by selecting and/or varying one or more parameters according to desired properties. Examples of at least some of said parameters and/or said properties include, without limitation, one or more of inlet/outlet concentration of salt and/or other impurities, refrigerant temperature (e.g., at inlet and/or outlet of thermoacoustic refrigerator, freeze desalination system, and/or brine container), crystal growth rate, brine/coolant flow rate, presence of additives (e.g., seed crystals), effective partition coefficient, solute yield, freezing time, freezing temperature, crystal size distribution, crystal size, energy consumption, salinity gradient characteristics, and the like.

FIGS. 3A-3E are schematic diagrams of a freeze-melting cycle within a brine container of an integrated thermoacoustic freeze desalination system and process, according to one or more embodiments of the invention.

Figure 3A:
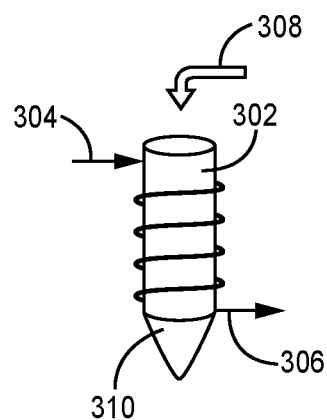
FIGS. 3A-3E are schematic diagrams of a freeze-melting cycle within a brine container of an integrated thermoacoustic freeze desalination system and process, according to one or more embodiments of the invention.

As shown in FIG. 3A, brine feed 308 is supplied to brine container 302 which includes ice chamber 310. A coolant for inducing crystallization of water to ice may come into thermal communication with brine container 302 by travelling through coolant inlet 304, through coolant coils wound or coiled about side walls of brine container 302 a plurality of times, and exiting via coolant outlet 306.

Figure 3B:
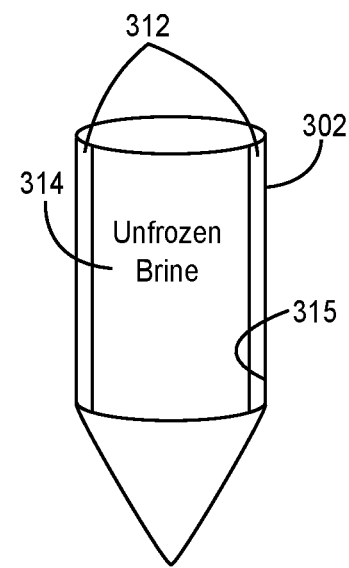

FIG. 3B illustrates a schematic diagram of a cross-section of the brine container 302. The coolant flowing through the coolant coils in thermal contact with the brine container 302 may cause an ice film 312, having a reduced concentration of salts and other impurities, to form on the sidewalls 315 of the brine container 302, leaving brine solution 314 which is slightly more concentrated than the brine solution prior to the formation of the ice film 312.

Figure 3C:
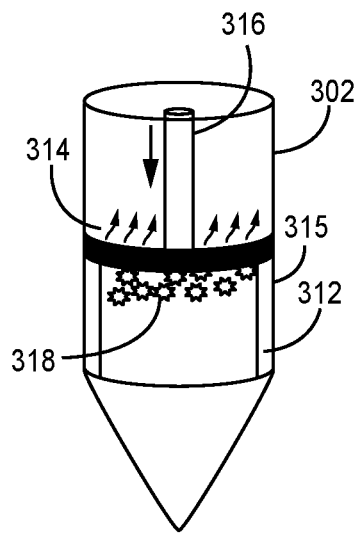

As shown in FIG. 3C, an ice scraper 316 may be used for dislodging the ice film 312 from the sidewalls 315 of the brine container 302. In the illustrated embodiment, the ice scraper permits unfrozen brine 314 to pass through as the ice is dislodged or scraped from the sidewalls 315 of the brine container 302 and directed towards the ice chamber 310.

Figure 3D:
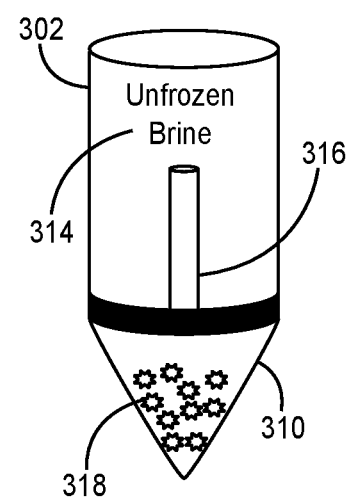

FIG. 3D is a schematic diagram showing ice in the ice chamber 310 and unfrozen brine 314 in the brine container 302 at least partially separated from said ice, with the ice scraper optionally serving as a functional barrier separating the ice from the unfrozen brine.

Figure 3E:
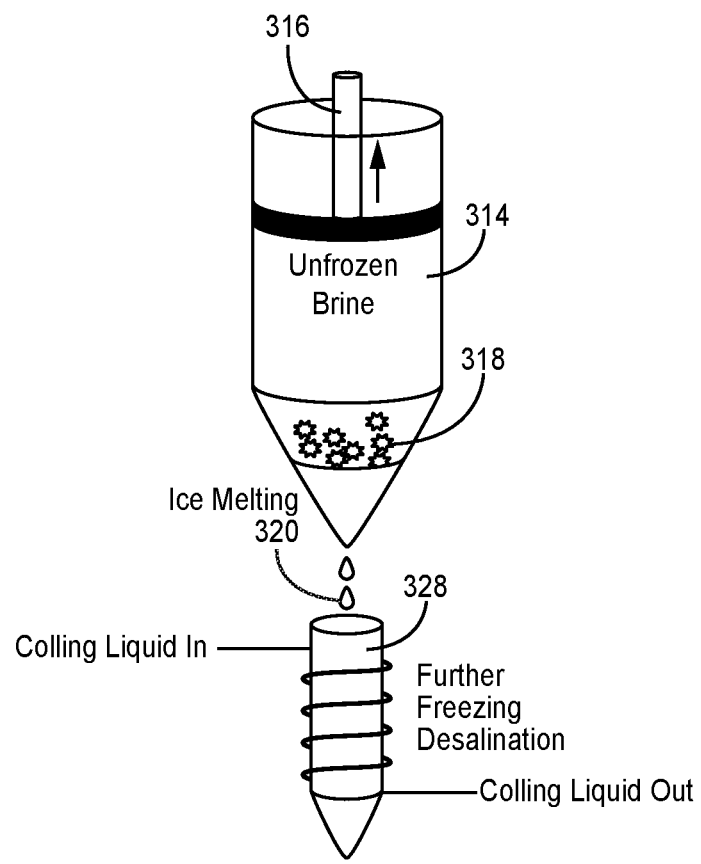

FIG. 3E is a schematic diagram showing ice scraper 316 being lifted within brine container 302 and ice 318 melting in ice chamber 310 to produce at least partially desalinated water 320. The at least partially desalinated water 320 may be directed to another brine container 328 for one or more additional freeze-melting cycles.

In some embodiments, an integrated thermoacoustic freeze desalination system may include one or more of a thermoacoustic device, a thermoacoustic refrigerator, and a freeze desalination system. The integration of the thermoacoustic device, the thermoacoustic refrigerator, and the freeze desalination system may be suitable for production of potable water. A concentrated solar energy source, such as a solar dish, may be used for driving the thermoacoustic engine which produces acoustic energy. The produced acoustic energy may be directly coupled to the thermoacoustic refrigerator. The thermoacoustic refrigerator may be used to produce a cold coolant capable of inducing the crystallization of water to ice via the freeze desalination system. A single cooling source, the thermoacoustic refrigerator and/or coolant, may be used for the successive freezing and melting cycles. Although the coolant may increase in temperature as it flows through the freeze desalination system, the reduction in salinity levels of the water corresponds to an increase in the freezing temperature of the resulting ice, permitting the coolant to perform more than one freeze-melting cycle as it flows through the freeze desalination system, even though the temperature of the coolant continues to increase as well. In this way, the system may be designed to maintain the reduction in salinity, and thereby the higher freezing temperature of the resulting ice, is aligned with the increase in temperature of the cold coolant as it flows through the freeze desalination system.

Figure 4:
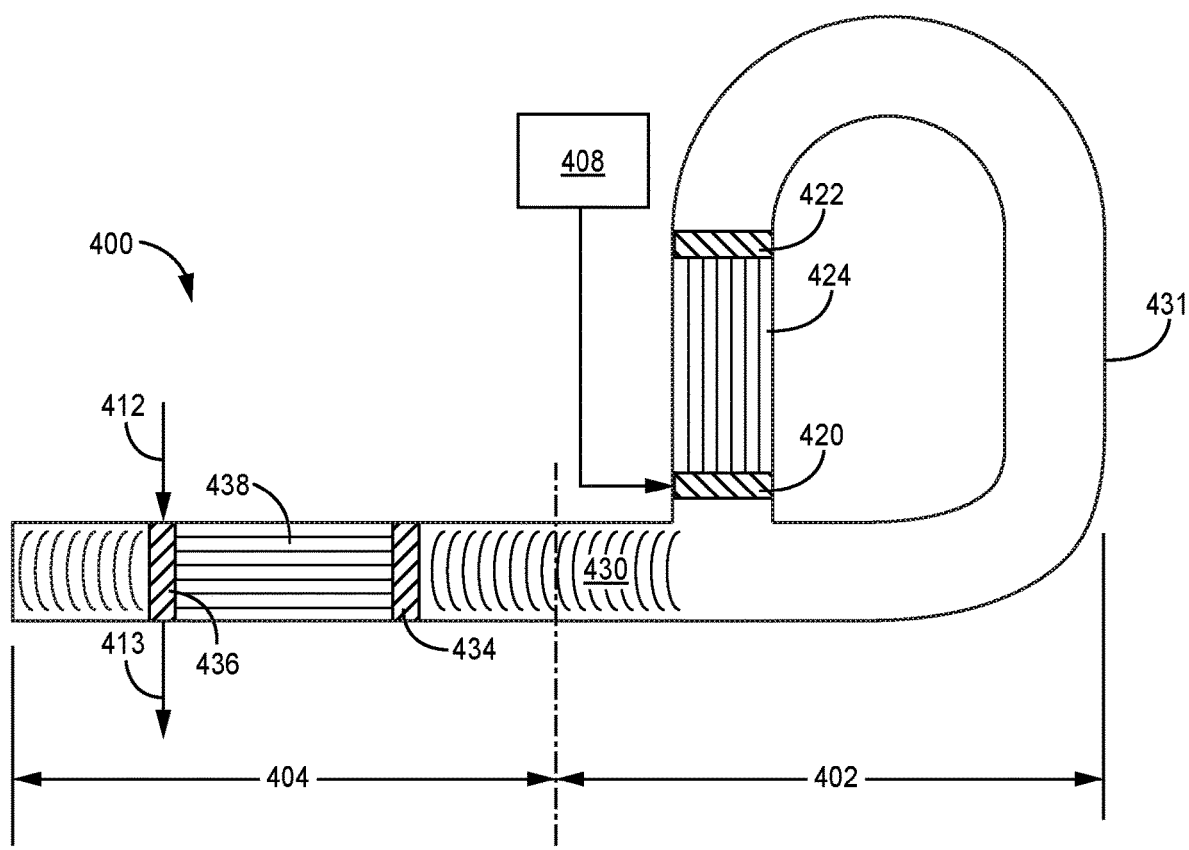
FIG. 4 is a schematic diagram of a portion of an integrated water desalination system and process, according to one or more embodiments of the invention.

FIG. 4 illustrates a partial schematic diagram of integrated thermoacoustic freeze desalination system and process 400. Many components or portions of integrated freeze desalination system and process 400 are similar to those found in integrated freeze desalination system and process 200 shown in FIG. 2, however, integrated freeze and desalination system and process 400 includes resonator 430 with looped tube 431.

Thermoacoustic refrigerator 404 and thermoacoustic engine 402 are integrated within resonator 430. A high or low temperature heat source 408 is provided for supplying heat to thermoacoustic engine 402. A high temperature heat source 408 may exhibit an inlet temperature (e.g., at heat exchanger 420) of about 800° C. or less, such as about equal to any one of, or between any two of, about 800° C., about 750° C., about 700° C., about 650° C., about 600° C., about 550° C., about 500° C., about 450° C., about 400° C., about 350° C., about 300° C., or about 251° C. A low temperature heat source 408 may exhibit inlet temperatures (e.g., at heat exchanger 420) of between 15° C. and 250° C., such as about equal to any one of, or between any two of, about 250° C., about 200° C., about 150° C., about 100° C., about 50° C., or about 15° C. Integrated thermoacoustic freeze desalination system and process 400 of FIG. 4 may include any of the features, characteristics, and properties of integrated thermoacoustic freeze desalination system and process 100 of FIG. 1. Accordingly, for example, any of the heat sources and/or brine sources of the present disclosure may be used herein without departing from the scope of the present invention.

As mentioned above, thermoacoustic engine 402 may produce acoustic waves used to drive operation of thermoacoustic refrigerator 404. To enable operable integration of thermoacoustic engine 402 with thermoacoustic refrigerator 404, each may be acoustically coupled to each other (e.g., within resonator 430) such that the acoustic waves produced by thermoacoustic engine 402 are incident upon thermoacoustic refrigerator 404. The incident acoustic waves may supply mechanical energy/work utilized by thermoacoustic refrigerator 404 to drive heat removal from the hot coolant 412 passing through thermoacoustic refrigerator 404. Thermoacoustic engine 402 and thermoacoustic refrigerator 404 may also be fluidly coupled to each other via a working gas within resonator 430. Examples of the working gas include, without limitation, one or more of air, helium, argon, neon, krypton, xenon, radon, $CO_2$, and the like. Combinations may be used (e.g., air with helium, air with $CO_2$, etc.) to modulate viscosity, thermal conductivity, and specific heat of the working fluids. The working gas may be used for transporting the acoustic waves from, for example, thermoacoustic engine 402 to thermoacoustic refrigerator 404. In the illustrated embodiment of FIG. 4, resonator 430 may be used to acoustically couple and/or fluidly couple thermoacoustic engine 402 to thermoacoustic refrigerator 404. Resonator 430 may be implemented in standing wave thermoacoustic engines 402. In other embodiments, one or more regenerators (not shown) may be implemented in traveling or moving wave thermoacoustic engines.

In thermoacoustic engine 402, thermoacoustic engine stack 424 may be spatially disposed between first heat exchanger 420 and second heat exchanger 422, within the thermoacoustic engine 402, for transferring heat to and from external heat sources 408 and the working fluid within resonator 430. Thermoacoustic engine stack 424 may be a porous solid material, such as a porous stack of heating plates. Heat from external heat source 408 may be supplied to thermoacoustic engine 402 via first heat exchanger 420, forming a temperature gradient along the length of the thermoacoustic engine stack 424. The temperature gradient may create a pressure disturbance in the working fluid, causing the working fluid to oscillate in resonator 430. As the working fluid oscillates back and forth, compression and expansion of the working fluid by the sound pressure results in heat transfer from first heat exchanger 420 to second heat exchanger 422. Acoustic waves 428 cause the working fluid to oscillate back and forth. Since the oscillating working fluid, incident upon thermoacoustic refrigerator 404, imparts mechanical work, acoustic waves 428 may be used to drive thermoacoustic refrigerator 204.

In thermoacoustic refrigerator 404, thermoacoustic refrigerator stack 438 (e.g., a heat regenerative stack) may be spatially disposed between first heat exchanger 434 and second heat exchanger 436, within thermoacoustic refrigerator 404. Thermoacoustic refrigerator 404 may be operated as a standing wave device and/or a traveling wave device. Thermoacoustic refrigerator stack 438 may be similar to thermoacoustic engine stack 424 and may include, for example, a porous solid material such as a porous stack of heating plates. Acoustic waves 428 from thermoacoustic engine 402 may supply the input work required for heat to flow against a temperature gradient and thus remove heat from the hot coolant. Thermoacoustic refrigerator 404 and thermoacoustic engine 402 may use or share the same working gas.

Upon exiting thermoacoustic refrigerator 404, the cold coolant 413 may be directed to a freeze desalination system (not illustrated in FIG. 4, but may be similar in nature to the freeze desalination system illustrated in FIG. 2), where it may participate in one or more freeze cycles, and upon completing one or more of said freeze cycles, may be directed back to thermoacoustic refrigerator 404 as a hot coolant stream 412. Thermoacoustic refrigerator 404 may regenerate the cold coolant stream by removing sufficient heat from the hot coolant stream to decrease the temperature thereof to a suitable freeze desalination temperature. The temperature of the cold coolant (e.g., the coolant exiting from the thermoacoustic refrigerator) should be sufficiently low to induce/cause crystallization of the water to ice. In some embodiments, for example, the temperature of the coolant may be at or near the freezing temperature of the brine. In some embodiments, the temperature of the coolant is sufficiently low such that the cold coolant can cool the brine to a temperature below the freezing temperature of said brine.

The scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure has been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. An integrated thermoacoustic freeze desalination system comprising:
   a thermoacoustic engine, wherein the thermoacoustic engine is configured to generate mechanical energy in the form of acoustic waves using heat supplied from a heat source;
   a thermoacoustic refrigerator acoustically coupled to the thermoacoustic engine, wherein the thermoacoustic refrigerator is adapted to use the mechanical energy in the acoustic waves produced by the thermoacoustic engine to remove heat from a coolant flowing through said thermoacoustic refrigerator; and
   a freeze desalination system fluidly coupled to the thermoacoustic refrigerator and the thermoacoustic engine, wherein the freeze desalination system is configured to desalinate brine via a process in which the coolant from the thermoacoustic refrigerator flows through the freeze-desalination system and causes at least a portion of the water from the brine to freeze and separate from the brine.

2. The integrated thermoacoustic freeze desalination system of claim 1, wherein the heat source is at least one of the following: a solar source, an internal combustion engine, a gas turbine, a steam turbine, an industrial fire heater, a steam boiler, a metal melting furnace, and a refinery flare.

3. The integrated thermoacoustic freeze desalination system of claim 1, wherein the thermoacoustic engine is a standing wave thermoacoustic engine including a resonator.

4. The integrated thermoacoustic freeze desalination system of claim 1, wherein the thermoacoustic engine is a traveling wave thermoacoustic engine including a regenerator.

5. The integrated thermoacoustic freeze desalination system of claim 4, wherein the regenerator includes a looped tube.

6. The integrated thermoacoustic freeze desalination system of claim 1, wherein the freeze desalination system includes a first plurality of brine containers connected in series and cooling coils for conveying coolant in thermal contact with the first plurality of brine containers.

7. The integrated thermoacoustic freeze desalination system of claim 6, wherein the coolant flowing through the cooling coils causes the water portion from the brine to freeze and form ice on the sidewalls of the first plurality of brine containers.

8. The integrated thermoacoustic freeze desalination system of claim 7, wherein the first plurality of containers includes ice scrapers for scraping the ice from the sidewalls of the first plurality of containers.

9. The integrated thermoacoustic freeze desalination system of claim 8, wherein the first plurality of containers include ice collection chambers where the scraped ice is allowed to melt.

10. The integrated thermoacoustic freeze desalination system of claim 9, wherein unfrozen brine portions are directed to downstream brine containers for further desalination.

11. The integrated thermoacoustic freeze desalination system of claim 9, wherein the melted water portions from the ice collection chambers of the first plurality of containers are discharged to at least a second plurality of brine containers connected in series.

12. The integrated thermoacoustic freeze desalination system of claim 11, wherein the cooling coils which are in thermal contact with the first plurality of brine containers are also in thermal contact with at least the second plurality of brine containers.

13. The integrated thermoacoustic freeze desalination system of claim 11, wherein the second plurality of brine containers include ice scrapers for scraping ice from the sidewalls of the second plurality of brine containers and ice collection chambers where the scraped ice is allowed to melt.

14. The integrated thermoacoustic freeze desalination system of claim 11, wherein unfrozen brine portions are directed to another downstream brine container within the second plurality of brine containers for further desalination and wherein melted water portions from the ice collection chambers of the second plurality of brine containers are discharged to either a water collector or a third plurality of brine containers connected in series.

15. The integrated thermoacoustic freeze desalination system of claim 1, wherein coolant from the freeze desalination system is directed back to the thermoacoustic refrigerator via a colling liquid circuit for further cooling.

16. An integrated thermoacoustic freeze desalination process comprising:
 (a) supplying heat from a heat source to a thermoacoustic engine, wherein the thermoacoustic engine uses said heat to generate mechanical energy in the form of acoustic waves;
 (b) applying the mechanical energy in the acoustic waves produced by the thermoacoustic engine to a thermoacoustic refrigerator to remove heat from a coolant passing through said thermoacoustic refrigerator; and
 (c) flowing the coolant from the thermoacoustic refrigerator through a freeze desalination system to desalinate brine, wherein the coolant causes at least a portion of the water from the brine to freeze and separate from the brine.

17. The integrated thermoacoustic freeze desalination process of claim 16, further comprising recycling the coolant from the freeze desalination system back to the thermoacoustic refrigerator for further cooling.

18. The integrated thermoacoustic freeze desalination process of claim 16, wherein the freeze desalination system includes at least a first plurality of brine containers, the first plurality of brine containers including ice scrapers for scraping ice formed on the sidewalls of the first plurality of brine containers, ice collection chambers where the scraped ice is allowed to melt, and cooling coils in thermal contact with the first plurality of brine containers for conveying coolant.

19. The integrated thermoacoustic freeze desalination process of claim 18, further comprising discharging melted water from the ice collection chambers to a water collector or at least a second plurality of brine containers for further desalination.

20. The integrated thermoacoustic freeze desalination process of claim 18, further comprising directing unfrozen brine portions to downstream brine containers for further desalination.

* * * * *